United States Patent
Pan et al.

(10) Patent No.: US 9,336,792 B2
(45) Date of Patent: May 10, 2016

(54) SYSTEMS AND METHODS FOR VOICE ENHANCEMENT IN AUDIO CONFERENCE

(71) Applicant: Marvell World Trade Ltd., St. Michael (BB)

(72) Inventors: Qi Pan, Shanghai (CN); Xing Li, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 462 days.

(21) Appl. No.: 13/870,082

(22) Filed: Apr. 25, 2013

(65) Prior Publication Data
US 2013/0297302 A1 Nov. 7, 2013

Related U.S. Application Data

(60) Provisional application No. 61/643,529, filed on May 7, 2012.

(51) Int. Cl.
*H04M 3/56* (2006.01)
*H04M 9/08* (2006.01)
*G10L 21/02* (2013.01)
*G10L 21/0208* (2013.01)

(52) U.S. Cl.
CPC ............... *G10L 21/02* (2013.01); *H04M 3/568* (2013.01); *H04M 9/082* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 2005/0213747 A1* | 9/2005 | Popovich et al. | 379/406.03 |
| 2008/0144794 A1* | 6/2008 | Gardner | 379/202.01 |
| 2011/0116638 A1* | 5/2011 | Son et al. | 381/1 |
| 2011/0200196 A1* | 8/2011 | Disch et al. | 381/22 |

* cited by examiner

*Primary Examiner* — Simon Sing
*Assistant Examiner* — Jeffrey Lytle

(57) ABSTRACT

System and methods are provided for voice enhancement in audio conferencing among a plurality of participants. An example system includes a signal processor, a pre-processing component, and a voice-enhancement component. The signal processor is configured to generate a first mixed signal based at least in part on a first audio signal associated with a first remote participant and a local audio signal associated with a local participant. The pre-processing component is configured to generate a first input signal and a second input signal based at least in part on the first mixed signal and a second audio signal associated with a second remote participant. In addition, the voice-enhancement component is configured to generate a first output signal to be transmitted to the second remote participant based at least in part on the first input signal and the second input signal.

20 Claims, 8 Drawing Sheets

SYSTEMS AND METHODS FOR VOICE ENHANCEMENT IN AUDIO CONFERENCE

CROSS-REFERENCE TO RELATED APPLICATIONS

This disclosure claims priority to and benefit from U.S. Provisional Patent Application No. 61/643,529, filed on May 7, 2012, the entirety of which is incorporated herein by reference.

FIELD

The technology described in this patent document relates generally to signal processing and more particularly to audio signal processing.

BACKGROUND

Voice enhancement techniques, such as acoustic echo cancellation, are often implemented in communication systems, for example, to reduce echoes that result from the coupling between speaker(s) and microphone(s) at one end of a two-way communication.

FIG. 1 depicts an example two-way communication system 100. As shown in FIG. 1, a near-end communication device 102 used by a local user communicates with a far-end communication device 110 through networks 130. Specifically, within the near-end communication device 102, a microphone 104 may be used for capturing the local user's voices 114 and for producing an audio signal 112 to be transmitted to the far-end communication device 110. A speaker 106 located near the microphone 104 produces sounds 116 based on an audio signal 108 received from the far-end communication device 110. The sounds 116 produced by the speaker 106 may be picked up by the microphone 104 (e.g., directly or through reflection by walls or other objects) and may therefore be transmitted to the far-end communication device 110, which often results in echoes at the far-end communication device 110. Acoustic echo cancellation may be used to reduce the contribution from the speaker 106 in the audio signal 112 from the microphone 104.

FIG. 2 depicts an example two-way communication system 200 with acoustic echo cancellation. As shown in FIG. 2, in the two-way communication system 200, an acoustic-echo-cancellation (AEC) component 218 within a near-end communication device 202 is used to reduce echoes at a far-end communication device 210. Particularly, the AEC component 218 processes a recorded signal 212 from a microphone 204, using an audio signal 208 received from the far-end communication device 210 as a reference. The recorded signal 212 includes contribution from a speaker 206. The output signal 220 of the AEC component 218 is then transmitted to the far-end communication device 210 via networks 230.

As an example, the AEC component 218 may process the recorded signal 212 and generate the audio signal 220 according to the following formula:

$$V_i = V_s$$

$$V_r = V_s + N_f$$

$$V_t = AEC\{V_r, V_f\} = AEC\{V_s + N_f, V_f\} \quad (1)$$

where $V_i$ represents an ideal audio signal to be transmitted, and $V_s$ represents a local user's voices 214. In addition, $N_f$ represents a noise signal, and $V_r$ represents the recorded signal 212. Furthermore, $V_t$ represents the output signal 220 of the AEC component 218, and $V_f$ represents the audio signal 208. "AEC" in the formula (1) represents an acoustic-echo-cancellation function with two input signals (e.g., the audio signals 208 and 212).

FIG. 3 depicts an example communication terminal 300. As shown in FIG. 3, the communication terminal 300 (e.g., a cell phone) includes two modems 302 and 304. For example, the modems 302 and 304 may be used separately for independent two-way communications, or used together for a three-way audio conference. For example, an application processor 306 and the modem 302 are on a same chip 308, and the modern 304 is on a different chip. An acoustic-echo-cancellation (AEC) component may be included in each of the modems 302 and 304.

SUMMARY

In accordance with the teachings described herein, system and methods are provided for voice enhancement in audio conferencing among a plurality of participants. An example system includes a signal processor, a pre-processing component, and a voice-enhancement component. The signal processor is configured to generate a first mixed signal based at least in part on a first audio signal associated with a first remote participant and a local audio signal associated with a local participant. The pre-processing component is configured to generate a first input signal and a second input signal based at least in part on the first mixed signal and a second audio signal associated with a second remote participant. In addition, the voice-enhancement component is configured to generate a first output signal to be transmitted to the second remote participant based at least in part on the first input signal and the second input signal.

In one embodiment, an integrated circuit for voice enhancement in audio conferencing among a plurality of participants includes a pre-processing circuit and a voice-enhancement circuit. The pre-processing circuit is configured to receive a first mixed signal representing a mixture of a first audio signal associated with a first remote participant and a local audio signal associated with a local participant, and configured to generate a first input signal and a second input signal based at least in part on the first mixed signal and a second audio signal associated with a second remote participant. The voice-enhancement circuit is configured to generate a first output signal to be transmitted to the second remote participant based at least in part on the first input signal and the second input signal.

In another embodiment, a method is provided for voice enhancement in audio conferencing among a plurality of participants. A first audio signal associated with a first remote participant and a local audio signal associated with a local participant are received. A first mixed signal is generated based at least in part on the first audio signal and the local audio signal. A first input signal and a second input signal are generated based at least in part on the first mixed signal and a second audio signal associated with a second remote participant. A first output signal is generated to be transmitted to the second participant based at least in part on the first input signal and the second input signal.

DETAILED DESCRIPTION

Figure 1:
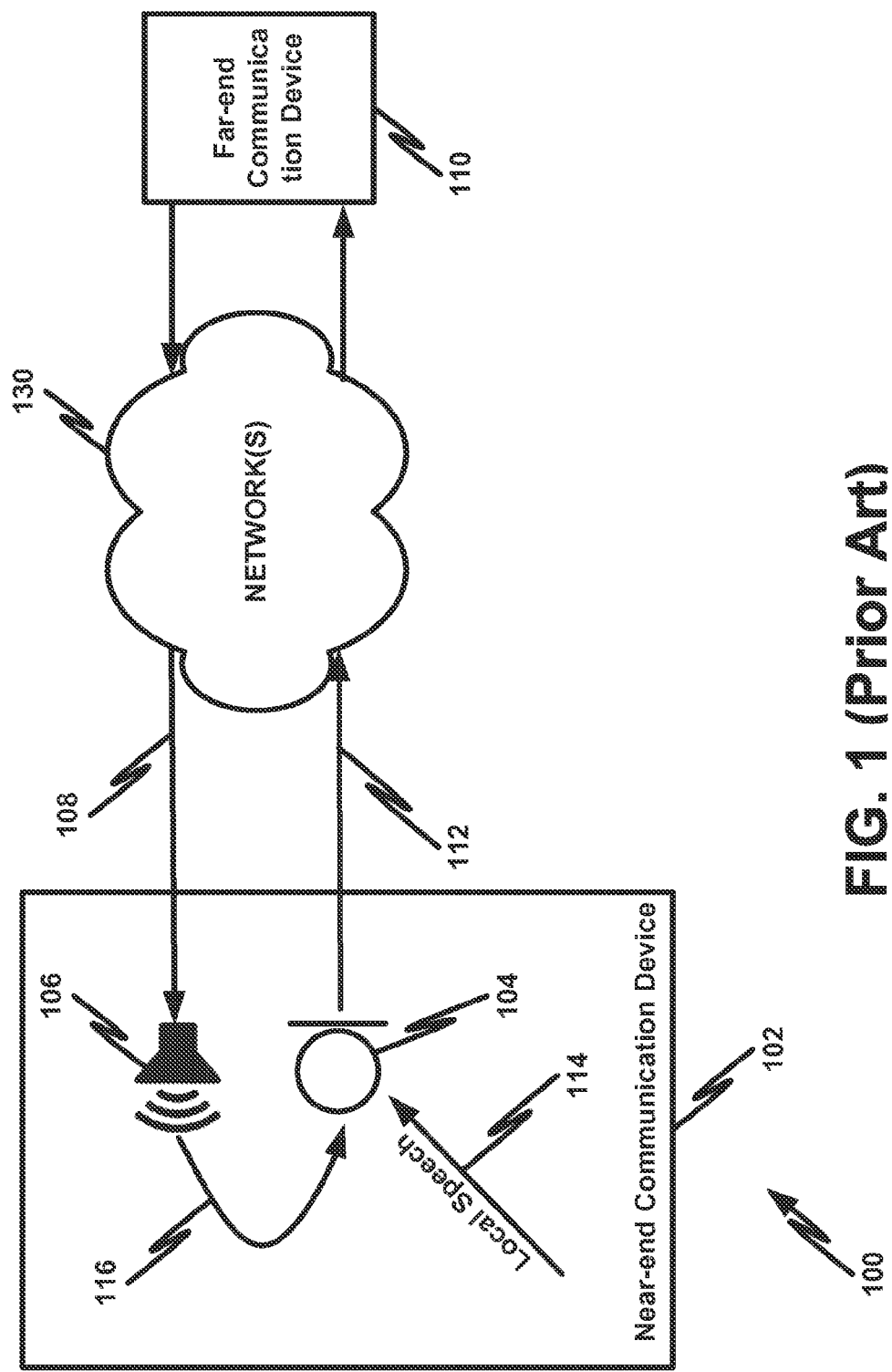
FIG. 1 depicts an example two-way communication system.
Figure 2:
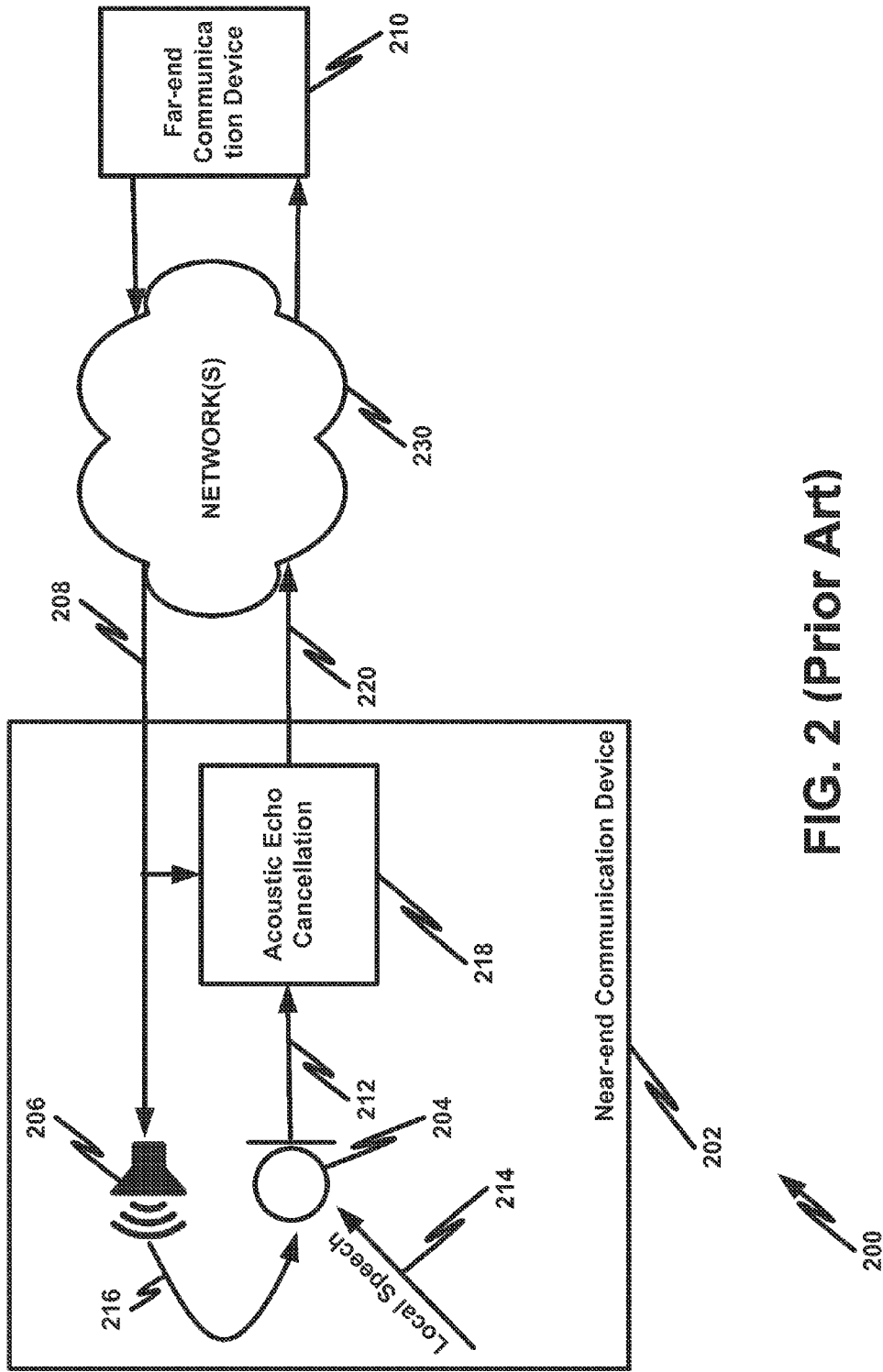
FIG. 2 depicts an example two-way communication system with acoustic echo cancellation.
Figure 3:
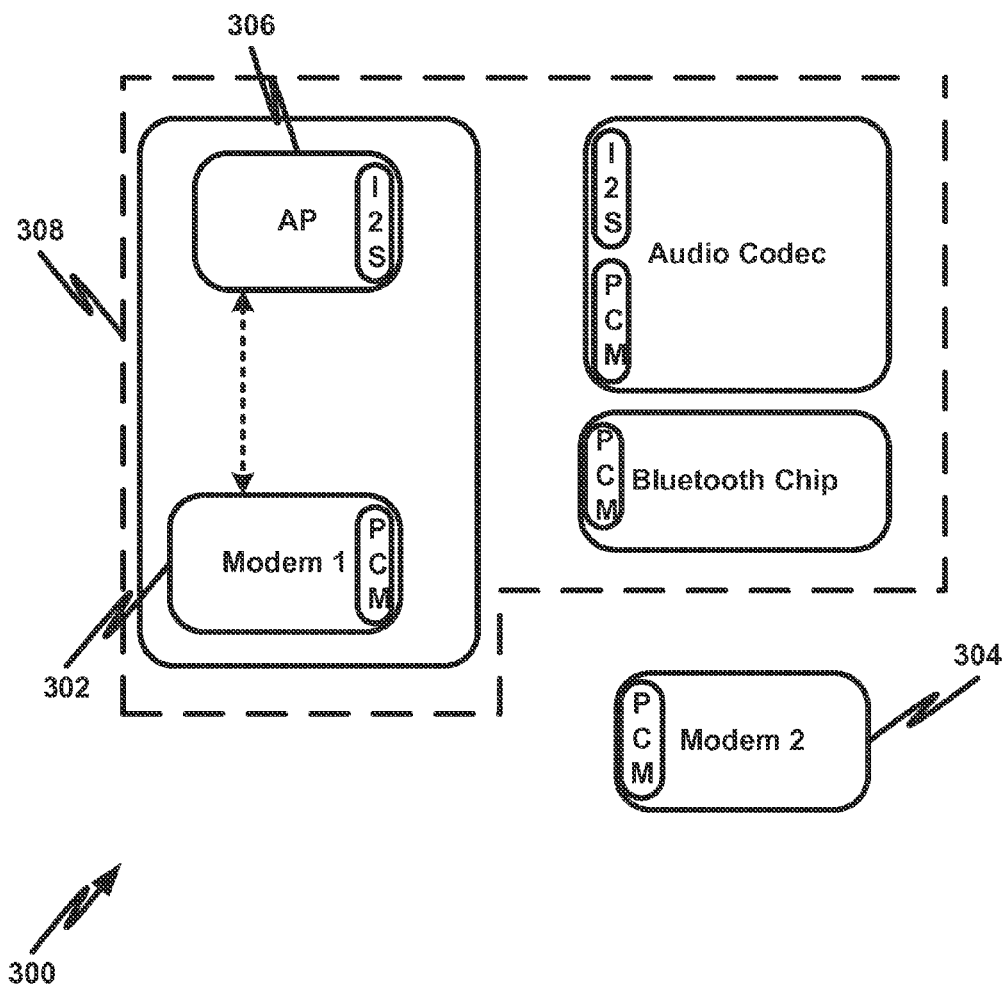
FIG. 3 depicts an example communication terminal.

Referring to FIG. 3, when either the modem 302 or the modem 304 is used for a two-way communication, the AEC component within the modem 302 or the modem 304 may perform acoustic echo cancellation, e.g., as shown in FIG. 2. However, acoustic echo cancellation is much more difficult in a three-way audio conference scenario.

Figure 4:
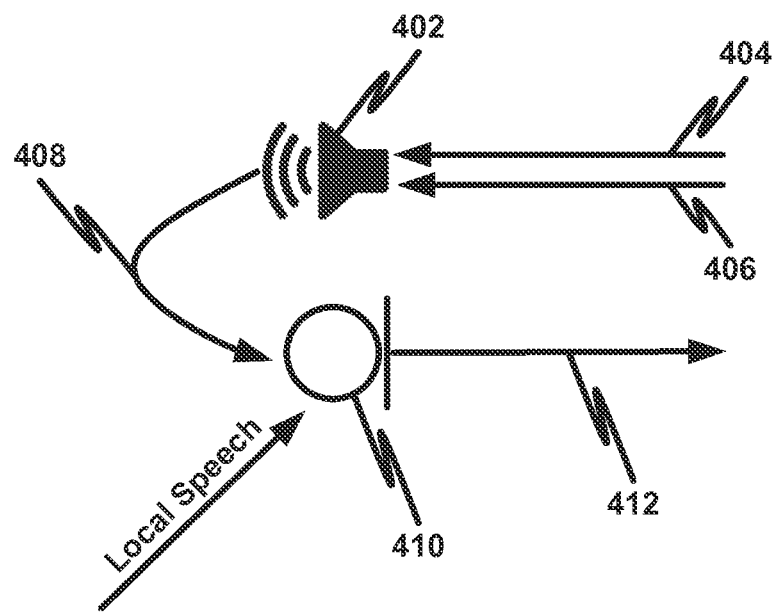
FIG. 4 depicts an example three-way audio conference scenario for the communication terminal.

FIG. 4 depicts an example three-way audio conference scenario for the communication terminal 300. A speaker 402 in the communication terminal 300 receives audio signals 404 and 406 from devices of two participants of the three-way conference, and generates sounds 408 which are picked up by a microphone 410. Thus, the output 412 of the microphone 410 may include contributions from both the audio signals 404 and 406. As shown in FIG. 2, an AEC component often has only two input signals: the recorded output of the microphone, and the audio signal received from a single far-end device as a reference for processing the recorded output of the microphone. However, in the three-way audio conference scenario, all of the output 412 of the microphone 410 and the audio signals 404 and 406 received from two far-end devices may be needed for acoustic echo cancellation. The conventional AEC component capable of handling only two input signals may not be used to effectively reduce echoes for the three-way audio conference. Further, modifying the AEC component so that it can receive three input signals usually requires changing the interface and the physical layout of the AEC component, which often results in increased costs and system complexity.

Figure 5:
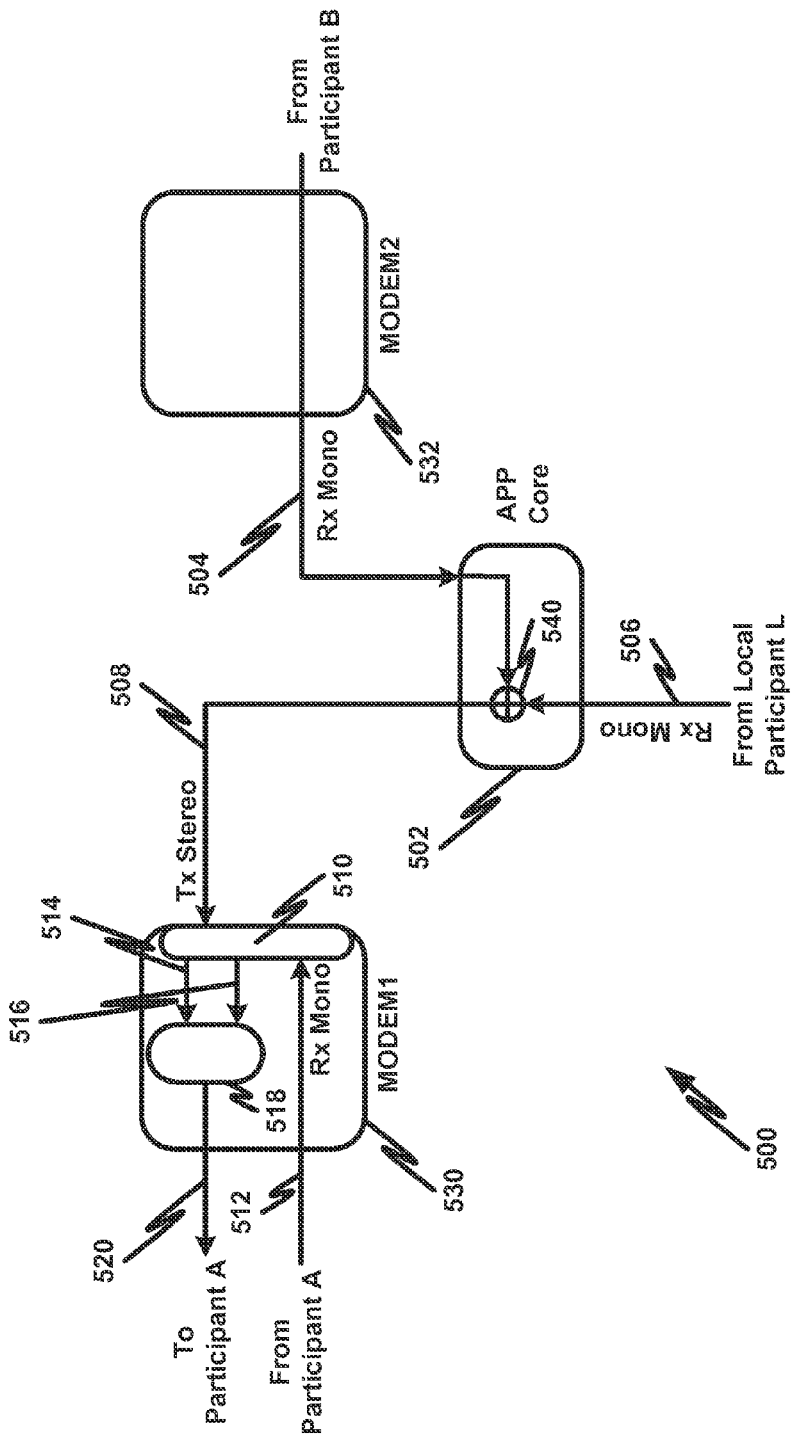
FIG. 5 depicts a diagram showing an example communication system for audio conferencing.

FIG. 5 depicts a diagram showing an example communication system 500 for audio conferencing. The three-way audio conference involves three participants, a remote participant A, a remote participant B, and a local participant L. The local participant L, using the communication system 500, serves as the leader of the audio conferencing. As shown in FIG. 5, the communication system 500 mixes the voices of the local participant L and the remote participant B and outputs an audio signal 520 to be transmitted to the remote participant A so that the participant A can hear the voices of both the local participant L and the remote participant B.

Specifically, an application core 502 mixes (e.g., interleaves), e.g., via a mixing operator 540, an audio signal 504 received from the remote participant B via a modem 532 and another audio signal 506 from the local participant L. A pre-processing component 510 within a modem 530 processes a mixed signal 508 from the application core 502 and an audio signal 512 received from the remote participant A via the modem 530 and outputs a recorded signal 514 (e.g., $V_r'$) and a reference signal 516 (e.g., $V_f'$) as two inputs to an AEC component 518 which in turn generates the audio signal 520 to be transmitted to the remote participant A.

The pre-processing component 510 and the AEC component 518 implement the following formula for acoustic echo cancellation:

$$V_t' = V_{sL} + V_{fB}$$

$$V_f' = N_{fA} + N_{fB}$$

$$V_f' = V_{fA} + V_{fB}$$

$$V_r' = V_t' + N_f' = V_{sL} + V_{fB} + N_{fA} + N_{fB}$$

$$V_t' = \text{AEC}\{V_r', V_f'\} = \text{AEC}\{V_t' + N_f', V_f'\} = \text{AEC}\{V_{sL} + V_{fB} + N_{fA} + N_{fB}, V_{fA}, V_{fB}\} \quad (2)$$

where $V_t'$ represents an ideal audio signal to be transmitted, $V_{sL}$ represents the audio signal 506 of the local participant L, and $V_{fB}$ represents the audio signal 504 of the remote participant B. In addition, $N_f'$ represents a mixed noise signal, $N_{fA}$ represents a noise signal associated with the modem 530, and $N_{fB}$ represents a noise signal associated with the modem 532. $N_f'$ represents the reference signal 516, and $V_{fA}$ represents the audio signal 512 of the remote participant A. Furthermore, $V_r'$ represents the recorded signal 514, $V_t'$ represents the output signal 520, and "AEC" in the formula (2) represents an acoustic-echo-cancellation function with two input signals (e.g., the signals 514 and 516).

For example, the audio signals 504, 506 and 512 are monophonic sounds produced using a single audio channel. In addition, the mixed signal 508 is a stereophonic sound produced using two or more independent audio channels, e.g., a left audio channel and a right audio channel.

Figure 6:
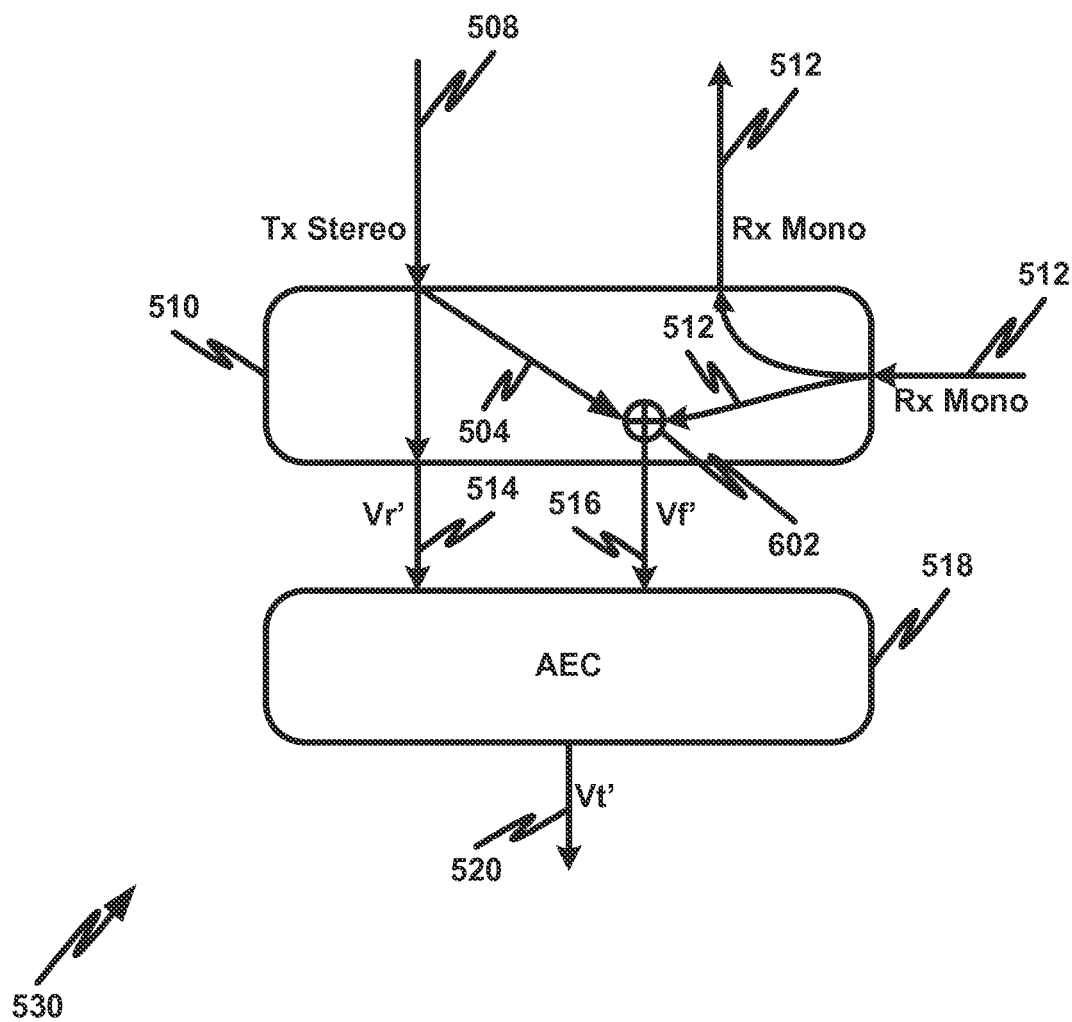
FIG. 6 depicts an example of the modem including the pre-processing component.

FIG. 6 depicts an example of the modem 530 including the pre-processing component 510. As shown in FIG. 6, the pre-processing component 510 outputs the recorded signal 514 and the reference signal 516 to the AEC component 518 based on the mixed signal 508 and the audio signal 512 received from the remote participant A.

Particularly, the pre-processing component 510 splits the mixed signal 508 into a left-audio-channel component and a right-audio-channel component. For example, the left-audio-channel component of the mixed signal 508 is equal to the recorded signal 514, and the right-audio-channel component of the mixed signal 508 is equal to the audio signal 504. The recorded signal 514 is provided to the AEC component 518 as an input signal. A mixing buffer 602 mixes the signal 504 with the audio signal 512 to generate the reference signal 516 to be provided to the AEC component 518 as another input signal.

Figure 7:
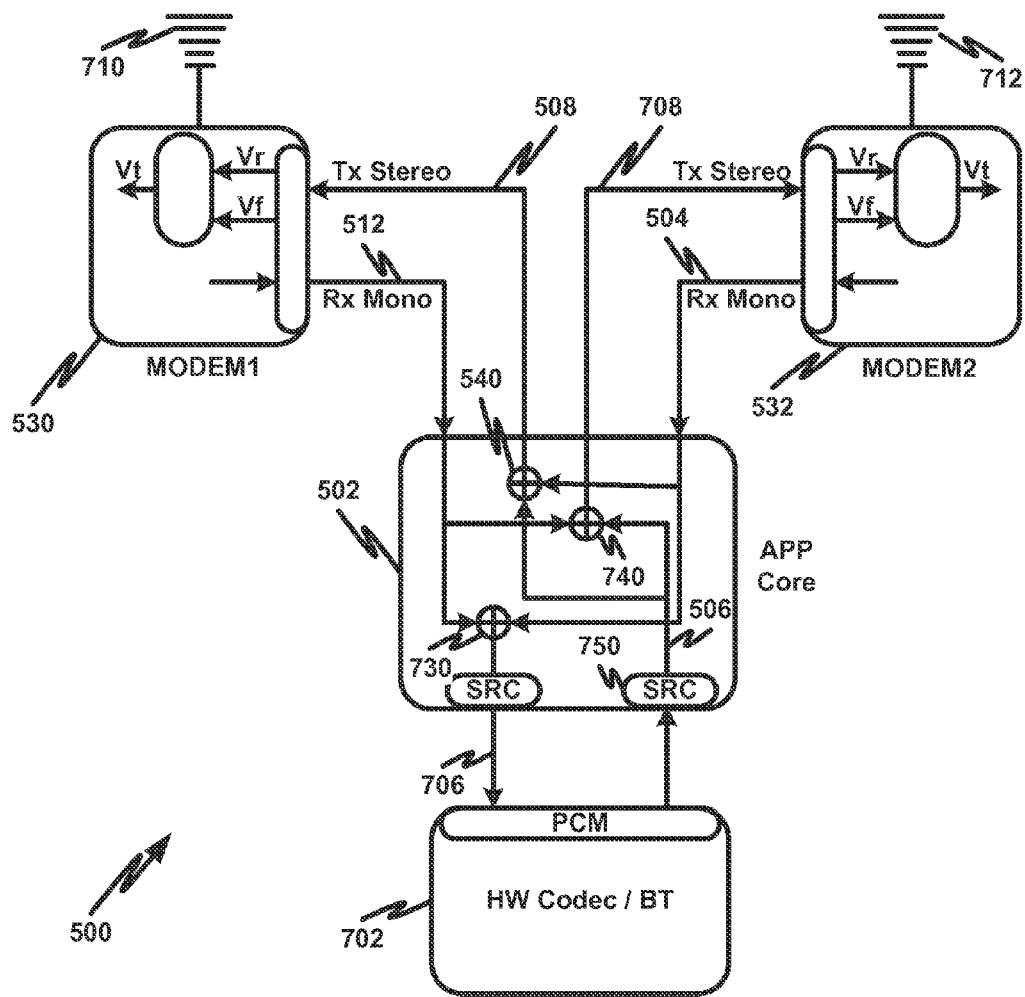
FIG. 7 depicts an example of the communication system for audio conferencing.

FIG. 7 depicts an example of the communication system 500 for audio conferencing. As shown in FIG. 7, the local participant L receives a mixture of the voices of both the remote participant A and the remote participant B. In addition, the voices of the local participant L and the remote participant B are mixed and transmitted to the remote participant A, and the voices of the local participant L and the remote participant A are mixed and transmitted to the remote participant B.

In addition to the mixing operator 540, the application core 502 includes a mixing buffer 730 and another mixing operator 740. The mixing buffer 730 is used to mix the audio signal 512 from the remote participant A and the audio signal 506 from the remote participant B and output a mixed signal 706 to a signal processor 702 so that the local participant L can hear the voices of both the participant A and the participant B. Moreover, the mixing operator 740 is used to mix the audio signal 512 from the remote participant A and the audio signal 506 from the local participant L and output a mixed signal 708 to be transmitted to the remote participant B.

For example, the application core 502 communicates with the signal processors 702 through one or more pulse-code-modulation (PCM) interfaces. Furthermore, the signal processor 702 uses one or more hardware encoders/decoders or one or more blue-tooth controllers for processing audio signals. The modem 530 may communicate with a far-end communication device of the remote participant A through an antenna 710, and the modem 532 may communicate with another far-end communication device of the remote participant B through an antenna 712. As an example, the application core 502 may include one or more sample-rate-conversion (SRC) components 750 which may be used for re-sampling the voices of the local participant L into the audio signal 506 (e.g., an 8 k or 16 k monophonic audio signal) before interleaving the audio signal 506 with the audio signal 512. The buffer 730 may be used to prevent audio signal underrun and the delay caused by the buffer 730 may be handled by the AEC components.

Figure 8:
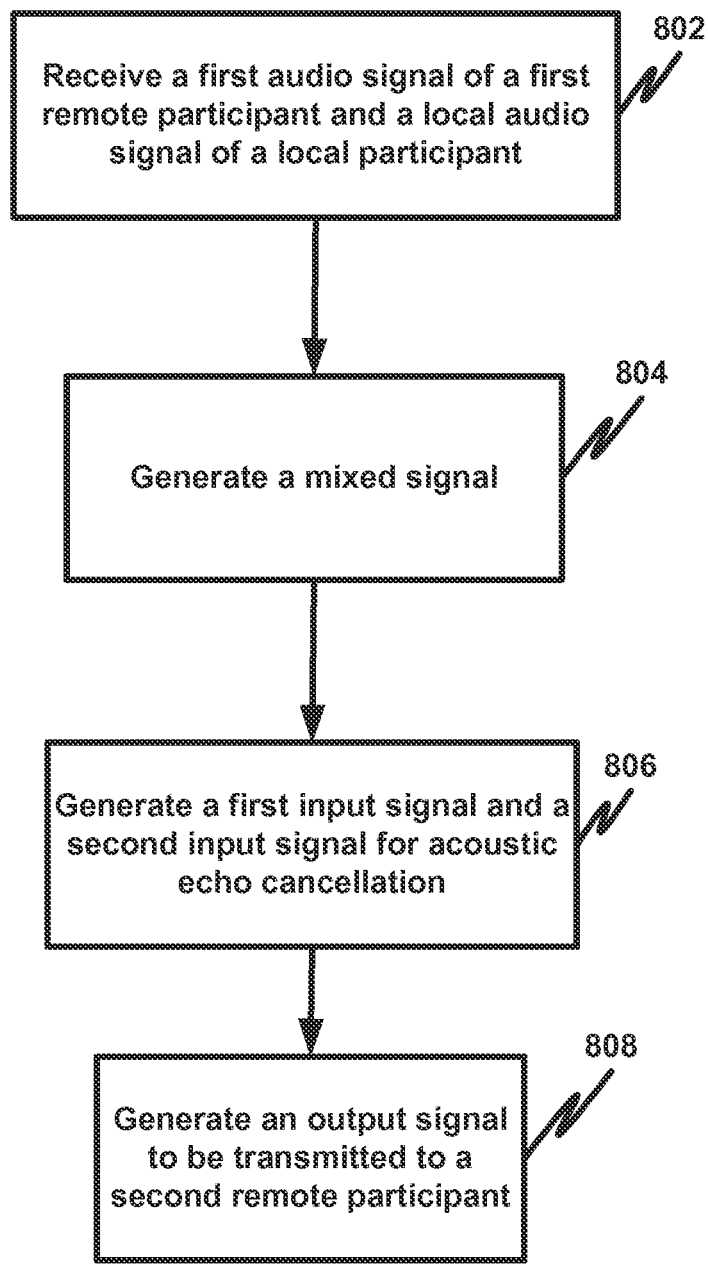
FIG. 8 depicts an example flow chart for performing acoustic echo cancellation audio conferencing.

FIG. 8 depicts an example flow chart for performing acoustic echo cancellation in audio conferencing. The audio conference may involve multiple remote participants and a local participant. At 802, a first audio signal associated with a first remote participant and a local audio signal associated with a local participant are received. At 804, a mixed signal is generated based at least in part on the first audio signal and the local audio signal. For example, the mixed signal is a stereophonic signal generated using two or more independent audio channels. At 806, a first input signal and a second input signal are generated for acoustic echo cancellation based at least in part on the mixed signal and a second audio signal associated with a second remote participant. At 808, an output signal is generated to be transmitted to the second remote participant based at least in part on the first input signal and the second input signal, so that the second remote participant can hear voices of both the first remote participant and the local participant.

This written description uses examples to disclose the invention, include the best mode, and also to enable a person skilled in the art to make and use the invention. The patentable scope of the invention may include other examples that occur to those skilled in the art. The disclosed systems and methods implementing acoustic echo cancellation algorithms are merely examples, which should not unduly limit the scope of the claimed invention. For example, the systems and methods disclosed in this document may be adapted to implement other voice enhancement algorithms, such as noise suppression algorithms and automatic gain control algorithms.

For example, the systems and methods described herein may be implemented on many different types of processing systems by program code comprising program instructions that are executable by the system processing subsystem. Other implementations may also be used, however, such as firmware or appropriately designed hardware configured to carry out the methods and systems described herein. In another example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

What is claimed is:

1. A communication system for voice enhancement in audio conferencing among a plurality of participants, the system comprising:
a signal processor configured to generate a first mixed signal based at least in part on a first audio signal associated with a first remote participant and a local audio signal associated with a local participant, and further configured to generate the first mixed signal using a left audio channel and a right audio channel, the first mixed signal including a left-audio-channel component and a right-audio-channel component;
a first pre-processing component configured to generate a first input signal and a second input signal based at least in part on the first mixed signal and a second audio signal associated with a second remote participant; and
a first voice-enhancement component configured to generate a first output signal to be transmitted to the second remote participant based at least in part on the first input signal and the second input signal;
wherein the first pre-processing component is further configured to generate the first input signal to be equal to the left-audio-channel component in magnitude, and generate the second input signal based at least in part on the right-audio-channel component and the second audio signal.

2. The system of claim 1, further comprising:
a second pre-processing component configured to generate a third input signal and a fourth input signal based at least in part on a second mixed signal and the first audio signal; and
a second voice-enhancement component configured to generate a second output signal to be transmitted to the first remote participant based at least in part on the third input signal and the fourth input signal;
wherein the signal processor is further configured to generate the second mixed signal based at least in part on the second audio signal and the local audio signal.

3. The system of claim 1, wherein the signal processor is further configured to generate the right-audio-channel component to be equal to the first audio signal in magnitude.

4. A communication system for voice enhancement in audio conferencing among a plurality of participants, the system comprising:
a signal processor configured to generate a first mixed signal based at least in part on a first audio signal associated with a first remote participant and a local audio signal associated with a local participant, and further configured to generate the first mixed signal using a left audio channel and a right audio channel, the first mixed signal including a left-audio-channel component and a right-audio-channel component;
a first pre-processing component configured to generate a first input signal and a second input signal based at least in part on the first mixed signal and a second audio signal associated with a second remote participant; and
a first voice-enhancement component configured to generate a first output signal to be transmitted to the second remote participant based at least in part on the first input signal and the second input signal;
wherein the signal processor is further configured to generate the left-audio-channel component based at least in part on an ideal audio signal to be transmitted and a mixed noise signal, the ideal audio signal representing a mixture of the local audio signal and the first audio signal.

5. The system of claim 4, wherein the mixed noise signal represents a mixture of a first noise signal associated with the first remote participant and a second noise signal associated with the second remote participant.

6. The system of claim 4, wherein the signal processor is further configured to generate the right-audio-channel component to be equal to the first audio signal in magnitude.

7. The system of claim 4, further comprising:
a second pre-processing component configured to generate a third input signal and a fourth input signal based at least in part on a second mixed signal and the first audio signal; and
a second voice-enhancement component configured to generate a second output signal to be transmitted to the first remote participant based at least in part on the third input signal and the fourth input signal;
wherein the signal processor is further configured to generate the second mixed signal based at least in part on the second audio signal and the local audio signal.

8. An integrated circuit for voice enhancement in audio conferencing among a plurality of participants, the integrated circuit comprising:
a first pre-processing circuit configured to receive a first mixed signal representing a mixture of a first audio signal associated with a first remote participant and a local audio signal associated with a local participant, and configured to generate a first input signal and a second input signal based at least in part on the first mixed signal and a second audio signal associated with a second remote participant; and
a first voice-enhancement circuit configured to generate a first output signal to be transmitted to the second remote participant based at least in part on the first input signal and the second input signal;
wherein the first mixed signal includes a left-audio-channel component and a right-audio-channel component; and
wherein the first pre-processing circuit is further configured to generate the first input signal to be equal to the left-audio-channel component in magnitude, and generate the second input signal based at least in part on the right-audio-channel component and the second audio signal.

9. The integrated circuit of claim 8, further comprising:
a second pre-processing circuit configured to generate a third input signal and a fourth input signal based at least in part on a second mixed signal and the first audio signal, the second mixed signal representing a mixture of the second audio signal and the local audio signal; and
a second voice-enhancement circuit configured to generate a second output signal to be transmitted to the first remote participant based at least in part on the third input signal and the fourth input signal.

10. The integrated circuit of claim 8, wherein the right-audio-channel component is equal to the first audio signal in magnitude.

11. An integrated circuit for voice enhancement in audio conferencing among a plurality of participants, the integrated circuit comprising:
a first pre-processing circuit configured to receive a first mixed signal representing a mixture of a first audio signal associated with a first remote participant and a local audio signal associated with a local participant, and configured to generate a first input signal and a second input signal based at least in part on the first mixed signal and a second audio signal associated with a second remote participant; and
a first voice-enhancement circuit configured to generate a first output signal to be transmitted to the second remote participant based at least in part on the first input signal and the second input signal;
wherein the first mixed signal includes a left-audio-channel component and a right-audio-channel component and
wherein the left-audio-channel component is related to an ideal audio signal to be transmitted and a mixed noise signal, the ideal audio signal representing a mixture of the local audio signal and the first audio signal.

12. The integrated circuit of claim 11, wherein the mixed noise signal represents a mixture of a first noise signal associated with the first remote participant and a second noise signal associated with the second remote participant.

13. The integrated circuit of claim 11, wherein the right-audio-channel component is equal to the first audio signal in magnitude.

14. The integrated circuit of claim 11, further comprising:
a second pre-processing circuit configured to generate a third input signal and a fourth input signal based at least in part on a second mixed signal and the first audio signal, the second mixed signal representing a mixture of the second audio signal and the local audio signal; and
a second voice-enhancement circuit configured to generate a second output signal to be transmitted to the first remote participant based at least in part on the third input signal and the fourth input signal.

15. A method for voice enhancement in audio conferencing among a plurality of participants, the method comprising:
receiving a first audio signal associated with a first remote participant and a local audio signal associated with a local participant;
generating a first mixed signal based at least in part on the first audio signal and the local audio signal;
generating a first input signal and a second input signal based at least in part on the first mixed signal and a second audio signal associated with a second remote participant; and
generating a first output signal to be transmitted to the second participant based at least in part on the first input signal and the second input signal;
wherein the first mixed signal includes a left-audio-channel component and a right-audio-channel component;
wherein the first input signal is equal to the left-audio-channel component in magnitude, and the second input signal is related to the right-audio-channel component and the second audio signal.

16. The method of claim 15, further comprising:
generating a second mixed signal based at least in part on the second audio signal and the local audio signal;
generating a third input signal and a fourth input signal based at least in part on the second mixed signal and the first audio signal; and
generating a second output signal to be transmitted to the first remote participant based at least in part on the third input signal and the fourth input signal.

17. A method for voice enhancement in audio conferencing among a plurality of participants, the method comprising:
receiving a first audio signal associated with a first remote participant and a local audio signal associated with a local participant;
generating a first mixed signal based at least in part on the first audio signal and the local audio signal;
generating a first input signal and a second input signal based at least in part on the first mixed signal and a second audio signal associated with a second remote participant; and
generating a first output signal to be transmitted to the second participant based at least in part on the first input signal and the second input signal;
wherein the first mixed signal includes a left-audio-channel component and a right-audio-channel component;

wherein the left-audio-channel component is related to an ideal audio signal to be transmitted and a mixed noise signal, the ideal audio signal representing a mixture of the local audio signal and the first audio signal.

18. The method of claim 17, wherein the mixed noise signal represents a mixture of a first noise signal associated with the first remote participant and a second noise signal associated with the second remote participant.

19. The method of claim 17, further comprising:
generating a second mixed signal based at least in part on the second audio signal and the local audio signal;
generating a third input signal and a fourth input signal based at least in part on the second mixed signal and the first audio signal; and
generating a second output signal to be transmitted to the first remote participant based at least in part on the third input signal and the fourth input signal.

20. The method of claim 17, wherein the right-audio-channel component is equal to the first audio signal in magnitude.

* * * * *